United States Patent
Tabayashi (10) Patent No.: US 10,040,298 B2
(45) Date of Patent: Aug. 7, 2018

(54) INKJET PRINTING DEVICE, INK SET, AND INKJET PRINTING METHOD

(71) Applicant: MIMAKI ENGINEERING CO., LTD., Nagano (JP)

(72) Inventor: Isao Tabayashi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/310,785

(22) PCT Filed: May 15, 2015

(86) PCT No.: PCT/JP2015/063970
§ 371 (c)(1),
(2) Date: Nov. 14, 2016

(87) PCT Pub. No.: WO2015/174510
PCT Pub. Date: Nov. 19, 2015

(65) Prior Publication Data
US 2017/0088736 A1    Mar. 30, 2017

(30) Foreign Application Priority Data

May 16, 2014 (JP) .................................. 2014-102715
May 16, 2014 (JP) .................................. 2014-102716

(51) Int. Cl.
*B41J 2/01*    (2006.01)
*B41J 11/00*   (2006.01)
(Continued)

(52) U.S. Cl.
CPC ........... *B41J 11/002* (2013.01); *B41J 2/2107* (2013.01); *B41M 1/18* (2013.01); *B41M 5/0017* (2013.01);
(Continued)

(58) Field of Classification Search
CPC ........ C09D 11/40; C09D 11/101; B41M 1/18; B41J 2/2107; B41J 11/002; B41J 2/2114; B41J 2/01
See application file for complete search history.

(56) References Cited

U.S. PATENT DOCUMENTS 7,891,799 B2 * 2/2011 Edwards ................ B41J 2/2114
                                                         347/100

FOREIGN PATENT DOCUMENTS

EP    2682272         1/2014
JP    2004-188920     7/2004
(Continued)

OTHER PUBLICATIONS

"International Search Report (Form PCT/ISA/210) of PCT/JP2015/063970", dated Aug. 18, 2015, with English translation thereof, pp. 1-4.
(Continued)

*Primary Examiner* — Geoffrey Mruk
(74) *Attorney, Agent, or Firm* — JCIPRNET (57) ABSTRACT

The aim is to form a print pattern remarkably glossy and quick-dry for efficient cure of inks. An inkjet printing device is provided that includes a controller. The controller prompts a UVLED unit to emit ultraviolet light to precure inks of an ink set discharged from an inkjet head unit by irradiating the inks with ultraviolet light. The controller further prompts the UVLED unit to irradiate the precured inks with ultraviolet light. The ink set includes color UV inks each containing an ultraviolet-curable resin and a colorant but containing no metallic particle, and a solvent UV ink containing an ultraviolet-curable resin, a solvent, and metallic particles.

3 Claims, 1 Drawing Sheet

(51) Int. Cl.
   *B41M 5/00*     (2006.01)
   *C09D 11/101*   (2014.01)
   *B41J 2/21*     (2006.01)
   *B41M 1/18*     (2006.01)

(52) U.S. Cl.
   CPC .............. *C09D 11/101* (2013.01); *B41J 2/01* (2013.01); *B41J 2/2114* (2013.01)

(56) References Cited

FOREIGN PATENT DOCUMENTS

| | | |
   |---|---|---|
   | JP | 2009-208227 | 9/2009 |
   | JP | 2012-102294 | 5/2012 |
   | JP | 2012-193261 | 10/2012 |
   | JP | 2012-206363 | 10/2012 |
   | JP | 2012-206367 | 10/2012 |
   | JP | 2013-147544 | 8/2013 |

OTHER PUBLICATIONS

"Search Report of Europe Counterpart Application", dated Apr. 21, 2017, p. 1-p. 6.

\* cited by examiner

INKJET PRINTING DEVICE, INK SET, AND INKJET PRINTING METHOD

CROSS-REFERENCE TO RELATED APPLICATION

The application is a 371 application of an International PCT application serial no. PCT/JP2015/063970, filed on May 15, 2015, which claims the priority benefits of Japan Application No. JP 2014-102716, filed on May 16, 2014, and Japan Application No. JP 2014-102715, filed on May 16, 2014. The entirety of each of the above-mentioned patent applications is hereby incorporated by reference herein and made a part of this specification.

TECHNICAL FIELD

The present invention relates to an inkjet printing device, an ink set, and an inkjet printing method.

BACKGROUND ART

Patent Literature 1 describes an ink set having a plurality of types of inks to be discharged from an inkjet printing device.

The ink set described in Patent Literature 1 has a metallic powder-dispersed metallic ink (first ink), and a second ink containing a polymerizable compound polymerized by being irradiated with ultraviolet light. The second ink contains the polymerizable compound in a greater amount than the metallic ink. When the ink set is used, the metallic ink is discharged on a print pattern of the second ink formed on a recording medium to attain a better adhesion between a print pattern of the metallic ink and the recording medium.

Patent Literature 2 describes an inkjet printing device equipped with an ultraviolet irradiator.

The inkjet printing device described in Patent Literature 2 has an ultraviolet irradiator that emits ultraviolet light to an extent that does not induce smearing of a UV ink (ultraviolet curable ink). By irradiating the UV ink repeatedly a predetermined number of times with ultraviolet light emitted from the ultraviolet irradiator, smearing of the UV ink may be prevented. This may also be an advantage in an attempt to downsize the ultraviolet irradiator.

CITATIONS LIST

Patent Literatures

Patent Literature 1: Japanese Unexamined Patent Publication No. 2012-193261 (published on Oct. 11, 2012)
Patent Literature 2: Japanese Unexamined Patent Publication No. 2004-188920 (published on Jul. 8, 2004)

SUMMARY

Technical Problems

However, there may be an issue with the ink set described in Patent Literature 1. When the metallic powder-dispersed metallic ink lands on the recording medium, the metallic powder may be non-unidirectionally oriented, in which case a print pattern that excels in glossiness may fail to be obtained.

The ink set described in Patent Literature 1 has only two kinds of inks; the metallic ink, and the second ink discharged to increase the adhesion of the metallic ink to the recording medium. For a print pattern in any color but the metallic color, therefore, a color ink set needs be additionally prepared.

In the inkjet printing device described in Patent Literature 2, ultraviolet light emitted from the ultraviolet irradiator has a rather weak light intensity and is emitted constantly at the same light intensity. Therefore, the ultraviolet irradiator needs to emit ultraviolet light numerous times. This requires more time to cure the ink. As a result, smearing of the ink is more likely to occur, and efficiency of curing the ink may be impaired.

To address these issues, the present invention is directed to providing an ink set that enables the formation of a metallic ink print pattern that excels in glossiness without the risk of ink smearing.

Solutions to the Problems

The present invention provides an inkjet printing device that discharges inks curable by being irradiated with ultraviolet light. The inkjet printing device includes a discharge unit that discharges an ink supplied from an ink set onto a recording medium; an ultraviolet irradiator disposed at a position behind the discharge unit in a scanning direction, the ultraviolet irradiator being operable to irradiate the ink discharged from the discharge unit and having landed on the recording medium with ultraviolet light; and a light quantity changing unit that changes a light quantity of ultraviolet light emitted from the ultraviolet irradiator onto the ink by changing a light intensity of ultraviolet light emitted from the ultraviolet irradiator. The light quantity changing unit, in a path of movement of the ultraviolet irradiator in the scanning direction, prompts the ultraviolet irradiator to emit a first light quantity of ultraviolet light for precure of the ink discharged in the path from the discharge unit and having landed on the recording medium. Then, the light quantity changing unit, in a path of movement of the ultraviolet irradiator in a direction opposite to the scanning direction, prompts the ultraviolet irradiator to emit a second light quantity of ultraviolet light for full cure of the ink procured. The ink set includes a color UV ink containing an ultraviolet-curable resin and a colorant but containing no metallic particle, and a solvent UV ink containing an ultraviolet-curable resin, a solvent, and metallic particles.

The present invention further provides an inkjet printing method that carries out a printing operation using inks curable by being irradiated with ultraviolet light. The inkjet printing method includes a discharging step of discharging an ink supplied from an ink set onto a recording medium; a first ultraviolet irradiating step of setting, in a path of movement of an ultraviolet irradiator in a scanning direction, a light quantity of ultraviolet light emitted from the ultraviolet irradiator as a first light quantity by changing a light intensity of ultraviolet light emitted from the ultraviolet irradiator, the first light quantity being intended for precure of the ink discharged in the discharging step and having landed on the recording medium, the first ultraviolet irradiating step further being a step of irradiating the ink discharged in the discharging step and having landed on the recording medium with the first light quantity of ultraviolet light; a second ultraviolet irradiating step of setting, after the first ultraviolet irradiating step, in a path of movement of the ultraviolet irradiator in a direction opposite to the scanning direction, the light quantity of ultraviolet light emitted from the ultraviolet irradiator as a second light quantity by changing the light intensity of ultraviolet light emitted from the ultraviolet irradiator, the second light quantity being intended for full cure of the ink precured in the first ultraviolet irradiating step, the second ultraviolet irradiating step further being a step of irradiating the ink precured in the first ultraviolet irradiating step with the second light quantity of ultraviolet light, the ink set including a color UV ink containing an ultraviolet-curable resin and a colorant but containing no metallic particle, and a solvent UV ink containing an ultraviolet-curable resin, a solvent, and metallic particles.

In the inkjet printing device disclosed herein, the ink discharged from the ink set through the discharge unit lands on the recording medium. When the first light quantity of ultraviolet light is emitted from the ultraviolet irradiator, the ink on the recording medium is precured. When the second light quantity of ultraviolet light is later emitted from the ultraviolet irradiator, the precured ink is then fully cured. Taking the step of precuring the ink before full cure may suppress the risk of ink smearing and may improve the ink in flatness. This may reduce any unevenness of the cured ink and also reduce light streaks due to the ink unevenness, improving the image quality of a printed matter. The present invention may enable precure and full cure of the ink by changing the light quantity of ultraviolet light emitted from the ultraviolet irradiator. Thus, the ultraviolet irradiator is usable for both of precure and full cure of the ink. This may successfully achieve cost reduction and ensure efficiency in the ink curing process.

When the ultraviolet irradiator moves in the scanning direction, the ink discharged from the discharge unit is irradiated with the first light quantity of ultraviolet light emitted from the ultraviolet irradiator. Then, the ultraviolet curable ink that has landed on the recording medium may be precured by the emitted light. When the ultraviolet irradiator moves in the opposite direction of the scanning direction, the precured ink is then irradiated with the second light quantity of ultraviolet light emitted from the ultraviolet irradiator. This may fully cure the ink so far only precured. Thus simply reciprocating the ultraviolet irradiator or the recording medium in the scanning direction may enable precure and full cure of the ink, allowing the ink to be more efficiently cured.

The light quantity is proportional to the light intensity. Therefore, the light quantity of ultraviolet light emitted from the ultraviolet irradiator may be easily changed by changing the light intensity of ultraviolet light emitted from the ultraviolet irradiator.

An ink set disclosed herein has a plurality of types of inks to be discharged from an inkjet printing device. These plural inks include a color UV ink containing an ultraviolet-curable resin and a colorant but containing no metallic particle, and a solvent UV ink containing an ultraviolet-curable resin, a solvent, and metallic particles.

After one of the inks of the ink set for printing use, the solvent UV ink containing metallic particles, has landed on the recording medium, the solvent is removed from the solvent UV ink. Then, a print pattern formed on the recording medium may be reduced in height to an extent substantially equal to the removed solvent. This may facilitate substantially parallel orientation of the metallic particles in the print pattern formed on the recording medium. Thus, the metallic particles may be uniformly oriented, and the print pattern obtained may excel in glossiness.

Further since the ink used for printing has the color UV ink, it is possible to print an object in a different color other than the metallic color. The solvent UV ink that excels in glossiness is used to form the print pattern in the metallic color, while the color UV ink very quick to dry is used to form a print pattern in a different color. This may improve the print patterns in glossiness and quick-dryness.

While the solvent UV ink is solely used to form the print pattern in the metallic color, the color UV ink very quick to dry is used to form the print pattern in a different color. Then, the print patterns may be fixed as desired to the recording medium by irradiating the inks with ultraviolet light alone, without having to additionally include a print pattern drying step.

In the ink set disclosed herein, the solvent UV ink preferably contains the solvent in a content of greater than or equal to 10% by weight and less than or equal to 90% by weight.

By using the solvent UV ink containing the solvent in a content that falls within the described range, the metallic particles may be oriented as desired in the print pattern after the solvent is removed from the solvent UV ink on the recording medium.

An inkjet printing method disclosed herein is provided that carries out a printing operation for a recording medium using the above-described ink set disclosed herein. The inkjet printing method includes: a discharging step of discharging the color UV ink onto the recording medium; a step of discharging the solvent UV ink onto the recording medium; and an ultraviolet irradiating step of irradiating the color UV ink and the solvent UV ink on the recording medium with ultraviolet light.

Since the solvent UV ink containing metallic particles is used to form the print pattern in the metallic color, the metallic particles may be uniformly oriented in the print pattern after the solvent is removed from the solvent UV ink on the recording medium. Then, the print pattern consequently obtained may excel in glossiness.

While the solvent UV ink is solely used to limn the print pattern in the metallic color, the color UV ink very quick to dry is used to form the print pattern in a different color. These print patterns, therefore, may be fixed as desired to the recording medium in the ultraviolet irradiating step alone, without having to additionally include a print pattern drying step.

The inkjet printing method may further include a step of drying the color UV ink and the solvent UV ink subsequent to the ultraviolet irradiating step.

The ink irradiated with ultraviolet light in the ultraviolet irradiating step is further dried in the drying step. This may more certainly fix the print pattern to the recording medium.

Effects of the Invention

In the present invention, the solvent UV ink that excels in glossiness is used to form the print pattern in the metallic color, while the color UV ink very quick to dry is used to form the print pattern in a different color. Then, the print patterns accordingly obtained may improve in glossiness and quick-dryness. Further, curing the inks in two stages of precure and full cure may improve efficiency in the ink curing process.

The solvent UV ink that excels in glossiness is used to form the print pattern in the metallic color, while the color UV ink very quick to dry is used to form the print pattern in a different color. The present invention thus provides for a dual purpose ink set that may achieve excellent glossiness and quick-dryness.

DESCRIPTION OF EMBODIMENTS

Hereinafter, embodiments of the present invention are described in detail.

[Inkjet Printing Device]

Hereinafter, preferred embodiments of the inkjet printing device disclosed herein are described in detail referring to the accompanying drawings. The same reference signs in FIGS. 1 and 2 represent the same structural elements.

Figure 1:
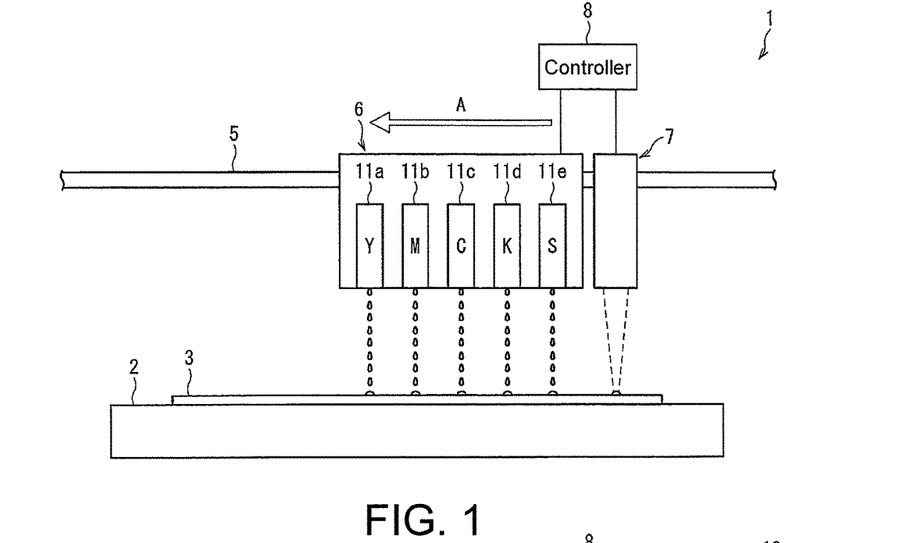
FIG. 1 is a schematic drawing of an inkjet printing device according to an embodiment of the present invention.
Figure 2:
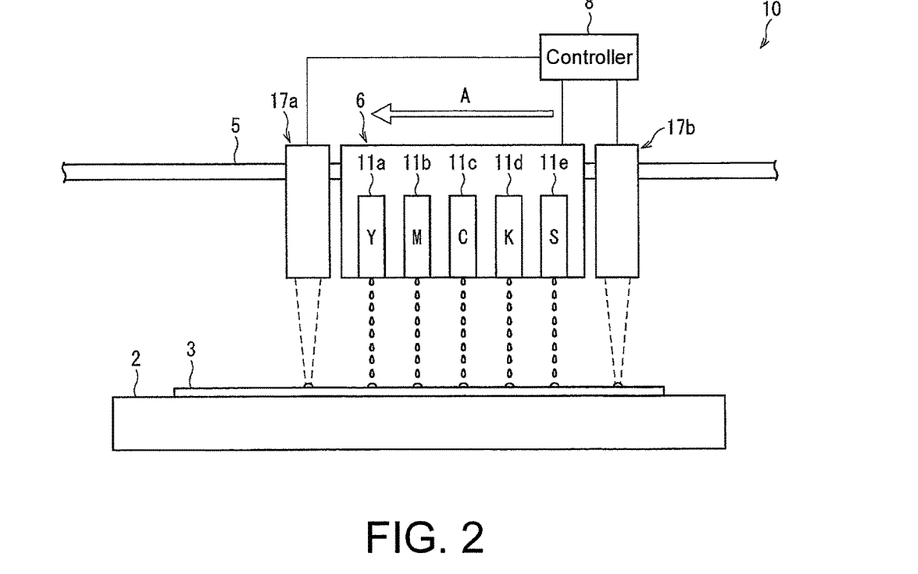
FIG. 2 is a schematic drawing of an inkjet printing device according to another embodiment of the present invention.

FIG. 1 is a schematic drawing of an inkjet printing device according to an embodiment of the present invention. As illustrated in FIG. 1, an inkjet printing device 1 uses an ink set including color UV inks and a metallic-colored solvent UV ink. The inkjet printing device 1 discharges the inks onto a recording medium 3 transported to and mounted on a platen 2 to print an image and/or a character on the recording medium 3.

The inkjet printing device 1 is equipped with a transport roller (not illustrated in the drawing) that transports the recording medium 3 mounted on the platen 2. The inkjet printing device 1 is further equipped with a guide rail 5. The guide rail 5 is hanging over the platen 2 (at a position upward in FIG. 2) in a direction orthogonal to a transport direction of the recording medium 3 (direction illustrated with arrow A). The guide rail 5 supports an inkjet head unit (discharge unit) 6 that discharges the UV (ultraviolet) inks, and an UVLED (ultraviolet light emitting diode) unit (ultraviolet irradiator) 7 that emits ultraviolet light. These units are movably held in a direction in which the guide rail 5 is extending.

[Inkjet Head Unit 6]

The inkjet head unit 6 has inkjet heads 11a to 11d that respectively discharge color inks of yellow Y, magenta M, cyan C, and black K toward the platen 2. The inkjet head unit 6 further has an inkjet head 11e that discharges a solvent UV ink having a metallic color S toward the platen 2. The ink tanks (not illustrated in the drawing) filled with the color inks are respectively coupled to the inkjet heads 11a to 11e.

The inkjet heads 11a to 11e are supplied with the different color inks from these ink tanks and discharge the supplied inks. Specifically, the UV ink of yellow Y is discharged from the inkjet head 11a, the UV ink of magenta M is discharged from the inkjet head 11b, the UV ink of cyan C is discharged from the inkjet head 11c, the UV ink of black K is discharged from the inkjet head 11d, and the solvent UV ink of the metallic color S is discharged from the inkjet head 11e.

The inkjet heads 11a to 11e are arranged linearly along a scanning direction A (direction illustrated with arrow A). The inkjet head unit 6 is driven by a driving unit, not illustrated in the drawing and thereby allowed to move in the scanning direction A (leftward on FIGS. 1 and 2) and in the opposite direction of the scanning direction A (rightward on FIGS. 1 and 2). By moving the inkjet head unit 6 in the scanning direction A, the five color UV inks are dischargeable on one line. The inkjet head unit 6 may be moved by, for example, having a transport belt coupled to the inkjet head unit 6 driven to rotate by a motor. A standby position of the inkjet head unit 6 is situated at a rear end part of the guide rail 5 in the scanning direction A (right end on FIGS. 1 and 2).

From the inkjet head unit 6, the color UV inks are discharged through the inkjet heads 11a to 11d onto the recording medium 3, and the solvent UV ink containing metallic particles is discharged through the inkjet head 11e onto the recording medium 3. Since the solvent UV ink containing metallic particles is used to form a print pattern in the metallic color, the metallic particles may be uniformly oriented after the solvent is removed from the solvent UV ink on the recording medium. Then, the print pattern consequently obtained may excel in glossiness.

[UVLED Unit 7]

The UVLED unit 7 is disposed at a position behind the inkjet head unit 6 in the scanning direction A. The UVLED unit 7 is driven by a driving unit, not illustrated in the drawing, and thereby allowed to move synchronously with the inkjet head unit 6 in the scanning direction A and the opposite direction of the scanning direction A. The UVLED unit 7, when moving in the scanning direction A, moves behind the inkjet head unit 6 in the direction of movement. On the other hand, the UVLED unit 7, when moving in the opposite direction of the scanning direction A, moves ahead of the inkjet head unit 6 in the direction of movement. As with the inkjet head unit 6, the UVLED unit 7 may be moved by, for example, having a transport belt coupled to the UVLED unit 7 be driven to rotate using a motor.

The UVLED unit 7 includes UVLED (not illustrated in the drawing) that emits ultraviolet light, and a condensing lens (not illustrated in the drawing). The condensing lens condenses ultraviolet light emitted from the UVLED. The condensing lens is disposed so as to have ultraviolet light emitted from the UVLED be condensed on the ink that has landed on the recording medium 3.

The UVLED unit 7 irradiates the discharged color UV inks and solvent UV ink on the recording medium 3 with ultraviolet light. In the inkjet printing device 1, the solvent UV ink is solely used to form the print pattern in the metallic color, while the color UV inks very quick to dry are used to form print patterns in the other colors. No drying step, therefore, may be necessary for the inks that have landed on the recording medium 3. By irradiating the inks with ultraviolet light emitted from the UVLED unit 7 immediately after the inks are discharged from the inkjet head unit 6, the print patterns may be promptly fixed to the recording medium 3.

[Controller 8]

The inkjet printing device 1 further has a controller (light quantity changing unit) 8 to control a transport roller, the inkjet head unit 6, and the UVLED unit 7.

The controller 8 controls the transport roller, inkjet head unit 6, and UVLED unit 7 by transmitting electric signals to the transport roller, inkjet head unit 6, and UVLED unit 7. The principal component of the controller 8 is a computer including, for example, CPU (central processing unit), ROM (read-only memory), and RAM (random-access memory).

The controller 8 drives the transport roller to transport the recording medium 3 on the platen 2 in the transport direction. The controller 8 also drives the inkjet head unit 6 to move in the scanning direction A or to move in the opposite direction of the scanning direction A. The controller 8 that controls the ink discharge by the inkjet heads 11a to 11e prompts the inkjet heads 11a to 11e to discharge the respective color inks. The controller 8 controls the UVLED unit 7 so as to synchronize with the inkjet head unit 6. The controller 8 prompts the UVLED unit 7 to move in the scanning direction A or to move in the opposite direction of the scanning direction A.

The controller 8 that controls the ultraviolet radiation from the UVLED unit 7 prompts the UVLED unit 7 to emit ultraviolet light. The controller 8, by regulating the light quantity of ultraviolet light emitted from the UVLED unit 7, precures and later fully cures the inks. The controller 8 changes the light intensity of ultraviolet light emitted from the UVLED unit 7 to regulate the ultraviolet light quantity. The ultraviolet light intensity is changeable by regulating electric current supplied to the UVLED unit 7. When a direct current is supplied to flow through the UVLED unit 7, the light intensity is changeable depending on the magnitude of a current value. When a pulse current is supplied to flow through the UVLED unit 7, the light intensity is changeable by changing a pulse width or a pulse number.

A detailed description is hereinafter given. The UV ink (monomer) is polymerized and thereby curable when irradiated with ultraviolet light. Before the ultraviolet radiation starts, the UV ink (UV ink that has just landed on the recording medium 3) is a low-viscosity liquid having a low molecular weight. This ink, when irradiated with ultraviolet light of approximately 20 mJ/cm$^2$ in light quantity, has a higher molecular weight and a higher viscosity, becoming gelatinous. This is the state of the ink precured. The precured ink may be said to be more solid than liquid. This precured ink, when irradiated with ultraviolet light of approximately 200 mJ/cm$^2$ in light quantity, has even a higher molecular weight. This is the state of the ink fully cured.

Then, the ink maintains its shape formed when the full cure is completed. The shape of the precured ink, on the other hand, is variable in shape. The shape change, however, may occur at a low rate of change. This may slow down the rate of outspread of the precured ink, reducing the ink thickness. Then, smearing of the ink may be less likely, and the ink improves in flatness.

The precure and full cure of the ink may not necessarily be as described above. For example, ultraviolet light in a light quantity for precure is solely emitted from the UVLED unit 7. Then, ultraviolet light in a light quantity for full cure is emitted from a full-cure UV lamp disposed downstream in the transport direction of the recording medium 3, and the precured ink is irradiated with this ultraviolet light.

The operation of the inkjet printing device 1 is hereinafter described. The operation of the inkjet printing device 1 described below is controlled by the controller 8. The processing unit (not illustrated in the drawing) of the controller 8 including the CPU is in charge of overall management of the transport roller, inkjet head unit 6, and UVLED unit 7 to prompt these devices to execute processing steps described below.

When the printing operation starts, the controller 8 drives the transport roller. Specifically, the controller 8 outputs a command that instructs the transport roller to transport the recording medium 3 on the platen 2 in the transport direction. Then, the transport roller transports the recording medium 3 and sets the recording medium 3 at a printing initial position (printing start position for per-pass movement).

Next, the controller 8 outputs a command that instructs the inkjet head unit 6 and the UVLED unit 7 to move at a predetermined rate of movement in the scanning direction A. The controller 8, to drive the inkjet head unit 6 and the UVLED unit 7 as instructed, outputs a command that instructs the inkjet head unit 6 and the UVLED unit 7 to move synchronously. Then, the inkjet head unit 6 and the UVLED unit 7 move synchronously at the predetermined rate of movement in the scanning direction A.

Then, the controller 8 outputs a command that instructs the inkjet heads 11*a* to 11*e* to discharge the respective color inks. Specifically, the controller 8 that prompts the ink discharge from the inkjet heads 11*a* to 11*e* outputs a command that instructs the inkjet heads 11*a* to 11*e* to discharge the inks when the inkjet head unit 6 arrives at a position at which the ink discharge should start. Then, the inkjet heads 11*a* to 11*e* discharge the respective color inks at positions where the respective color inks should be discharged. An encoder detects exact positions of the inkjet heads 11*a* to 11*e*. When detection data obtained by the encoder indicates a printing position in the scanning direction A, the controller 8, in response to the received detection data, outputs an ink discharge command.

Then, the controller 8 outputs a command that instructs the UVLED unit 7 to emit ultraviolet light at a first light intensity. Specifically, the controller 8, for precure of the inks, outputs a command that sets the light intensity of ultraviolet light emitted from the UVLED unit 7 as the first light intensity and instructs the UVLED unit 7 to emit ultraviolet light at the set light intensity. Then, the UVLED unit 7 starts to emit ultraviolet light at the first light intensity. As expressed in the formula, "light quantity=light intensity× irradiation time", the light quantity is a value calculated by multiplying the light intensity by irradiation time (hereinafter, the light quantity thus calculated is referred to as "cumulative light quantity"). When the UVLED unit 7 is moving at a predetermined rate of movement and irradiating the ink with ultraviolet light at the first light intensity, the cumulative light quantity of this ultraviolet light is 20 mJ/cm$^2$.

When the UVLED of the UVLED unit 7 is turned on (ultraviolet radiation), it takes a predetermined offset time for the UVLED to reach a required level of output (first light intensity). Taking into consideration such offset time of the UVLED of the UVLED unit 7, the controller 8 may desirably instruct the UVLED unit 7 to irradiate only a printable region of the recording medium 3 with ultraviolet light.

The UV ink (monomer) has a growing molecular weight by being irradiated with ultraviolet light in the cumulative light quantity of 20 mJ/cm$^2$. Then, this ink is increased in viscosity and precured. The shape of the precured ink is variable in shape. The shape change, however, may occur at a low rate of change. This may slow down the outspread of the ink before full cure, flattening the ink by degrees.

Next, the controller 8 outputs a command that instructs the inkjet head unit 6 and the UVLED unit 7 to move at a predetermined rate of movement in the opposite direction of the scanning direction A and to return to the standby position. The controller 8, to drive the inkjet head unit 6 and the UVLED unit 7 as instructed, outputs a command that instructs the inkjet head unit 6 and the UVLED unit 7 to continue to move in the opposite direction of the scanning direction A until they arrive at the standby position. Then, the inkjet head unit 6 and the UVLED unit 7 move in the opposite direction of the scanning direction A and finally arrive at the standby position.

The controller 8 further outputs a command that instructs the UVLED unit 7 to emit ultraviolet light at a second light intensity while the UVLED unit 7 is moving in the opposite direction of the scanning direction A. Specifically, the controller 8, for full cure of the UV ink, outputs a command that sets the light intensity of ultraviolet light emitted from the UVLED unit 7 as the second light intensity and instructs the UVLED unit 7 to emit ultraviolet light at the set light intensity. Then, the UVLED of the UVLED unit 7 starts to emit ultraviolet light at the second light intensity. When the UVLED unit 7 is moving at a predetermined rate of movement and irradiating the ink with ultraviolet light at the second light intensity, the cumulative light quantity of this ultraviolet light is 200 mJ/cm$^2$.

The precured ink has a further growing molecular weight by being irradiated with ultraviolet light in the cumulative light quantity of 200 mJ/cm$^2$. The ink is then fully cured.

Next, the controller 8 determines whether the printing operation is completed. When the printing operation is determined as incomplete, the controller 8 repeats the processing steps described so far. The controller 8 that has determined that the printing operation is completed ends the printing steps.

In the inkjet printing device 1, the inks are discharged from the inkjet head unit 6 (inkjet heads 11a to 11e) onto the recording medium 3. When the first light quantity of ultraviolet light is emitted from the UVLED unit 7, the UV ink (monomer) on the recording medium 3 is precured. When the second light quantity of ultraviolet light is later emitted from the UVLED unit 7, the precured UV ink is then fully cured. Taking the step of precuring the ink before full cure may suppress the risk of ink smearing and may improve the ink in flatness. This may reduce any unevenness of the cured ink and also reduce light streaks due to the ink unevenness, improving the image quality of a printed matter. Thus, the inks are flattened and reduced in thickness. When the inks are deposited in layers, therefore, the ink discharged on the already-deposited ink may have a smaller edge angle. This may reduce the likelihood that the ink closer to the recording medium 3 (lower side) repels and removes the ink deposited thereon.

The inkjet printing device 1 may enable precure and full cure of the inks by changing the light quantity of ultraviolet light emitted from the UVLED unit 7. Thus, the UVLED unit 7 is usable for both of precure and full cure of the inks. This may successfully achieve cost reduction and ensure efficiency in the ink curing process.

In the inkjet printing device 1, the UVLED unit 7 is disposed at a position behind the inkjet head unit 6 in the scanning direction A. When the UVLED unit 7 moves in the scanning direction A, therefore, the inks discharged from the inkjet heads 11a to 11e are irradiated with the first light quantity of ultraviolet light emitted from the UVLED unit 7. Then, the inks that have landed on the recording medium 3 may be precured by the emitted light. When the UVLED unit 7 later moves in the opposite direction of the scanning direction A, the precured inks are irradiated with the second light quantity of ultraviolet light emitted from the UVLED unit 7. This may fully cure the ink so far only precured. Thus simply reciprocating the UVLED unit 7 in the scanning direction A may enable precure and full cure of the UV inks, allowing the UV inks to be more efficiently cured.

In the inkjet printing device 1, the light quantity of ultraviolet radiation on the inks may be easily changed by changing the light intensity of ultraviolet light emitted from the UVLED unit 7. Since the UVLED unit 7 is driven to move at the predetermined rate of movement, the inks may be precured by being irradiated with ultraviolet light emitted at the first light intensity from the UVLED unit 7. Then, the precured inks may be fully cured by being irradiated with ultraviolet light emitted at the second light intensity from the UVLED unit 7. Instead, the light quantity of ultraviolet light emitted from the UVLED unit 7 may be changed by changing the rate of movement of the UVLED unit 7 and thereby changing irradiation time of ultraviolet light for the inks that have landed on the recording medium 3.

Thus far was described an embodiment of the present invention. However, the technical scope of the present invention is not necessarily limited to the described embodiment. It is described in this embodiment that the inkjet head unit 6 and the UVLED unit 7 are driven to move synchronously, however, these units may be driven to move asynchronously.

In the embodiment described above, the inkjet head unit 6 and the UVLED unit 7 are separate devices independently driven. The inkjet head unit 6 and the UVLED unit 7 may not necessarily be constrained as such. Optionally, the inkjet head unit 6 and the UVLED unit 7 may be coupled to each other or may be structured as an integral unit. In either one of the optional structures, the inkjet head unit 6 and the UVLED unit 7 may be moved integrally by a single driving unit.

In the embodiment, the UVLED unit 7 is disposed at a position behind the inkjet head unit 6 in the scanning direction A. The inkjet head unit 6 and the UVLED unit 7, however, may not necessarily be positioned as described. As illustrated in FIG. 2, the inkjet printing device 10 may have a UVLED unit 17a disposed at a position ahead of the inkjet head unit 6 in the scanning direction A, and a UVLED unit 17b disposed at a position behind the inkjet head unit 6 in the scanning direction A. Optionally, the inkjet printing device 10 may have the UVLED unit 7 disposed only at a position ahead of the inkjet head unit 6 in the scanning direction A.

In the inkjet printing device 10 illustrated in FIG. 2, when the inkjet head unit 6 and the UVLED units 17a and 17b are moving in the scanning direction A, the inks may be precured by being irradiated with ultraviolet light of 20 mJ/cm$^2$ in light quantity emitted from the UVLED unit 17b, with ultraviolet radiation from the UVLED unit 17a being suspended. When the inkjet head unit 6 and the UVLED units 17a and 17b are moving in the opposite direction of the scanning direction A, the precured inks may be fully cured by being irradiated with ultraviolet light of 100 mJ/cm$^2$ in light quantity emitted from a respective one of the UVLED units 17a and 17b. In case of changing the cumulative light quantity of ultraviolet radiation on the inks by changing the rate of movement of the UVLED unit 7, the UVLED units 17a and 17b may be moved at the rate of movement of 500 mm/sec., instead of the normal rate of movement 1,200 mm/sec. Then, ultraviolet light in the cumulative light quantity of 200 mJ/cm$^2$ may be emitted in total from the UVLED unit 17a.

In the embodiment, the inks are precured by being irradiated with ultraviolet light of 20 mJ/cm$^2$ in light quantity, and the precured inks are fully cured by being irradiated with ultraviolet light of 200 mJ/cm$^2$ in light quantity. The light quantities of ultraviolet light demanded for precure and full cure may be variable with different factors including ink ingredients. The light quantities, therefore, should preferably be decided as appropriate. Specifically, the light intensity of ultraviolet light necessary for cure of an ink depends on a resin(s) contained in the ink as a binder, for example, a monomer and/or an oligomer. When any commercially available products are used as the color UV inks and the solvent UV ink, instructions set forth in a user's manual should be followed.

In the embodiment, the UVLED is used as an example of the ultraviolet irradiator. This is, however, a non-limiting example. Any suitable one may be selected from the ultraviolet emitting devices including UV lamps. The UVLED unit may have one or more UVLEDs.

In the embodiment, the inkjet printing device 1 is equipped with the transport roller to transport the recording medium 3. Another suitable device but the transport roller may be employed to transport the recording medium 3.

It is described in this embodiment that the recording medium 3 is transported in the transport direction to allow the inkjet head unit 6, UVLED unit 7, and recording medium 3 to move relative to one another. It may be the recording medium 3 or the inkjet head unit 6 and the UVLED unit 7 that are configured to be movable. Optionally, the recording medium 3, inkjet head unit 6, and UVLED unit 7 may all be configured to be movable. The present invention may be applicable to a flatbed inkjet printing device having a flatbed on which the recording medium 3 is fixed, and a mechanism which moves the inkjet head unit 6 and the UVLED unit 7 in the transport direction and the opposite direction of the transport direction. Such a flatbed inkjet printing device is operable to move the recording medium 3, inkjet head unit 6, and UVLED unit 7 relative to one another in the transport direction. This flatbed inkjet printing device, therefore, may exert operational effects similarly to the inkjet printing device 1 configured to transport the recording medium 3 in the transport direction.

[Ink Set]

A plurality of different ink sets are available for the inkjet printing device 1, from which any suitable one may be selected for the ink types (number of colors) to be discharged from the inkjet printing device 1. The ink set used in the inkjet printing device 1 has metallic particle-free, color UV inks, and a metallic particle-containing solvent UV ink.

[Solvent UV Ink]

The solvent UV ink contains an ultraviolet-curable resin (UV-curable resin), an organic solvent, and metallic particles. In the solvent UV ink, the metallic particles are dispersed in a solution obtained by dissolving the UV-curable resin in the organic solvent. The solvent UV ink containing metallic particles may be referred to as a metallic ink. The solvent UV ink may further contain a pigment, a photopolymerization initiator, and a sensitizing agent.

The solvent is removed from the solvent UV ink after landing on the recording medium. Therefore, the print pattern on the recording medium may be reduced in height to an extent substantially equal to the removed solvent. This may facilitate substantially parallel orientation of the metallic particles of the ink in the print pattern formed on the recording medium. Thus, the metallic particles may be uniformly oriented, and the print pattern obtained may excel in glossiness.

[UV-Curable Resin]

The ultraviolet-curable resin contained in the solvent UV ink may be non-limitingly any compound curable by being irradiated with ultraviolet light. Examples of the ultraviolet-curable compound may include monomers and oligomers curable when polymerized by being irradiated with ultraviolet light.

Examples of the curable monomers may include low-viscosity acrylic monomers, vinyl ethers, oxetane-based monomers, and cycloaliphatic epoxy monomers. Examples of the curable oligomers may include acrylic oligomers.

The low-viscosity acrylic monomers are polymerized by radical polymerization to form cured resins. Examples of the low-viscosity acrylic monomers may include methoxy polyethylene glycol (n=3 or 9) acrylate, phenoxyethylene glycol acrylate, phenoxydiethylene glycol acrylate, phenoxyhexaethylene glycol acrylate, methoxy polyethylene glycol (n=2, 4, or 9) methacrylate, 3-chloro-2-hydroxypropyl methacrylate, β-carboxyethyl acrylate, acryloylmorpholine, diacetone acrylamide, vinyl formamide, N-vinyl pyrrolidone, neopentyl glycol dimethacrylate, 2PO neopentyl glycol dimethacrylate, polyethylene glycol (n=4 or 9) diacrylate, ethylene glycol dimethacrylate, nano ethylene glycol dimethacrylate, polypropylene glycol (n=2, 4, or 9) diacrylate, tetraethylene glycol diacrylate, glycerin dimethacrylate, glycerin acrylate methacrylate, modified epoxidized polyethylene glycol diacrylate, acrylic acid-2-(2-vinyloxyethoxy)ethyl, ethoxylated trimethylolpropane triacrylate, ethoxylated glycerin triacrylate (EO20 moles), and EO-modified trimethylolpropane acrylate.

The vinyl ethers are polymerized by cation polymerization to form cured resins. Examples of the vinyl ethers may include hydroxybutyl vinyl ether, triethylene glycol divinyl ether, cyclohexane dimethanol divinyl ether, propylene carbonate propenyl ether, dodecyl vinyl ether, cyclohexane dimethanol monovinyl ether, chclohexane vinyl ether, diethylene glycol divinyl ether, diethylene glycol divinyl ether, 2-ethylhexyl vinyl ether, dipropylene glycol divinyl ether, tripropylene glycol divinyl ether, hexanediol divinyl ether, octadecyl vinyl ether, butanediol divinyl ether, isopropyl vinyl ether, allyl vinyl ether, 1,4-butanediol divinyl ether, nonadiol divinyl ether, cyclohexanediol vinyl ether, cyclohexane dimethanol vinyl ether, triethylene glycol divinyl ether, trimethylol propane trivinyl ether, pentaerythritol tetravinyl ether, VEEA acrylic acid-2-(2-vinyloxyethoxy) ethyl, and VEEM methacrylic acid-2-(2-vinyloxyethoxy) ethyl. The curable monomers selected from the vinyl ethers may include a monomer expressed by the following chemical formula (I) or (II).

[Chemical Formula 1]

(I)

[Chemical Formula 2]

(II)

The oxetane-based monomers are polymerized by cation polymerization to form cured resins. Examples of the oxetane-based monomers may include 3-ethyl-3-hydroxymethyl oxetane, 1,4-bis-[((3-ethyloxetane-3-yl)methoxy)methyl] benzene, 3-ethyl-3-[((3-ethyloxetane-3-yl)methoxy)methyl] oxetane, 3-ethyl-3-(2-ethylhexyloxymethyl)oxetane, and 3-ethyl-3-(phenoxymethyl)oxetane.

The cycloaliphatic epoxy monomers are polymerized by cation polymerization to form cured resins. Examples of the cycloaliphatic epoxy monomers may include Celloxide 2000 and Celloxide 3000 supplied by Daicel Chemical Industries Co., Ltd., CYRACURE UVR-6015, CYRACURE UVR-6028, CYRACURE UVR-6105, CYRACURE UVR-6128, CYRACURE ERL-4140, and derivatives thereof supplied by Dow Chemical Company, and DCPD-EP and derivatives thereof supplied by Maruzen Petrochemical.

The acrylic oligomers are polymerized by cation polymerization to form cured resins. Examples of the acrylic oligomers may include hyper-branched polyester acrylate, polyester acrylate, urethane acrylate, and epoxy acrylate.

The content of the ultraviolet-curable compound in the solvent UV ink may preferably be greater than or equal to 1% by weight and less than or equal to 90% by weight of the whole solvent UV ink, and may more preferably be greater than or equal to 5% by weight and less than or equal to 60% by weight of the whole solvent UV ink. The solvent UV ink containing the ultraviolet-curable resin in a content within the mentioned range may be adequately cured by being irradiated with ultraviolet light.

[Organic Solvent]

The organic solvent contained in the solvent UV ink may preferably be a solvent in which the UV-curable resin is soluble and volatilized by heating and drying the solvent UV ink. Examples of such organic solvents may include but are not limited to hydrocarbon-based solvents, alcohols, ester-based solvents, ether-based solvents, ketone-based solvents, and glycol derivatives.

Specific examples of the glycol derivatives may be glycol ethers and glycol ether acetates including propylene glycol monomethyl ether, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate.

The hydrocarbon-based solvents may include, for example, aromatic hydrocarbon-based solvents, chlorinated hydrocarbon-based solvents, cycloaliphatic hydrocarbon-based solvents, and aliphatic hydrocarbon-based solvents. Specific examples may include n-hexane, n-heptane, n-octane, isooctane, cyclohexane, methyl cyclohexane, benzene, toluene, o-xylene, m-xylene, p-xylene, and ethylbenzene.

The ester-based solvents may include, for example, propyl formate, n-butyl formate, isobutyl formate, amyl formate, ethyl acetate, n-propyl acetate, isopropyl acetate, n-butyl acetate, isobutyl acetate, secondary butyl acetate, n-amyl acetate, isoamyl acetate, methyl isoamyl acetate, secondary hexyl acetate, methyl propionate, ethyl propionate, n-butyl propionate, methyl butyrate, ethyl butyrate, methyl lactate, and γ-butyrolactone.

The ketone-based solvents may include methyl ethyl ketone, methyl-n-propyl ketone, methyl-n-butyl ketone, methyl isobutyl ketone, diethyl ketone, ethyl-n-butyl ketone, di-n-propyl ketone, and mesityl oxide.

Any one of these exemplified organic solvents may be singly used, or two or more of them having different boiling points may be optionally combined and used in perspective of solubility of an infiltration inhibitor to be used, ink discharge stability, and ink dryness on a target recording medium.

The content of the organic solvent in the solvent UV ink may preferably be greater than or equal to 10% by weight and less than or equal to 90% by weight of the whole solvent UV ink composition, and more preferably greater than or equal to 40% by weight and less than or equal to 80% by weight of the whole solvent UV ink composition. By using the solvent UV ink containing the solvent in a content that falls within the described range, the print pattern may be successfully formed to such a height that allows the metallic particles to be uniformly oriented after the solvent is removed from the solvent UV ink on the recording medium.

[Metallic Particles]

The metallic particles may be added to impart a metallic texture to the print pattern. A metal used may be selected from metals suitable for the purpose of a printed matter, for example, silver and aluminum.

Examples of the metallic particle shape may preferably include but are not limited to a scaly shape and a flat shape. A further improved brightness may be attained by having the scaly or flat metallic particles oriented in a manner that the planar direction of the particles is parallel to the planer direction of the recording medium.

The content of the metallic particles in the solvent UV ink may preferably be greater than or equal to 1% by weight and less than or equal to 20% by weight of the whole solvent UV ink, and more preferably greater than or equal to 2% by weight and less than or equal to 10% by weight of the whole solvent UV ink. By using the solvent UV ink containing metallic particles in a content that falls within the described range, the metallic-colored print pattern may be suitably formed on the recording medium.

[Photopolymerization Initiator]

The photopolymerization initiator that can be contained in the solvent UV ink may be selected from any known photopolymerization initiators capable of efficiently initiating polymerization of the UV-curable resin in response to ultraviolet radiation. Examples of the photopolymerization initiators may include alkylphenone-based photopolymerization initiators, thioxanthone-based photopolymerization initiators, acylphosphine oxide-based photopolymerization initiators, and titanocene-based photopolymerization initiators. Any one of these exemplified photopolymerization initiators may be singly used, or two or more of them may be jointly used and contained in the ink.

[Sensitizing Agent]

The sensitizing agent that can be contained in the solvent UV ink may be selected from any known sensitizing agents capable of efficiently initiating reactions of the photopolymerization initiator in response to ultraviolet radiation. Specific examples of the sensitizing agents may be amines including trimethyl amine, methyl dimethanol amine, triethanol amine, p-diethylamino acetophenone, p-dimethyl ethyl aminobenzoate, p-dimethyl isoamyl aminobenzoate, and N,N-dimethylbenzyl amine. Any one of these exemplified sensitizing agents may be singly used, or two or more of them may be jointly used and contained in the ink.

[Other Additives]

The solvent UV ink may contain, in addition to the additives described so far, a diluent, an antifoaming agent, a pigment dispersant, a slipping agent, a leveling agent, and/or a polymerization inhibitor. The content in total of the photopolymerization initiator and other additives in the solvent UV ink may preferably be approximately 10% by weight of the whole ink composition.

The solvent UV ink may further contain a colorant, such as pigment, as with the color UV inks described later.

[Color UV Ink]

The color UV ink is a metallic particle-free, ultraviolet curable ink containing an ultraviolet-curable resin and a colorant. The metallic particle-free, color UV ink refers to a color UV ink not containing any metallic particles added to form a metallic-colored print pattern. This means that, unlike the solvent UV ink, none of the color UV inks contains the metallic particles.

The color UV ink is curable by being irradiated with ultraviolet light. The color UV ink contains, as a binder, an ultraviolet-curable resin polymerized by being irradiated with ultraviolet light. Examples of the ultraviolet-curable resin may include monomers or oligomers. The ultraviolet-curable resin that can be contained in the color UV ink may be the same as or similar to the ultraviolet-curable resin contained in the solvent UV ink.

The content of the monomer, oligomer, or polymer contained in the color UV ink that starts to be polymerized and cured by being irradiated with ultraviolet light may preferably be greater than or equal to 60% by weight and less than or equal to 90% by weight of the whole color UV ink, and more preferably greater than or equal to 70% by weight and less than or equal to 90% by weight of the whole color UV ink. The color UV ink containing any one of the ultraviolet-curable resins in a content within the mentioned range may be adequately cured by being irradiated with ultraviolet light.

The color UV ink excels in quick-dryness, requiring no drying step. The color UV ink that has landed on the recording medium may be promptly fixed to the recording medium with ultraviolet radiation alone. The color UV ink contains a colorant to form a print pattern in any desired color but the metallic color. For example, a color UV ink set may be used that includes UV inks in four colors; yellow (Y), magenta (M), cyan (C), and black (k).

The color UV inks may be selected from the commercially available products, suitable examples of which may include LF-140, LF-200, LH-100, and LUS-150 supplied by MIMAKI ENGINEERING CO., LTD.

[Colorant]

The colorant that can be contained in the color UV ink is not particularly limited in so far as the colorant is insoluble in the ultraviolet-curable resin. One selected from a variety of colorants may be used in accordance with an intended use. Examples of the colorant may include particles of at least one selected from the group consisting of organic pigments, inorganic pigments, oil-soluble dyes, disperse dyes, oxidation dyes, reactive dyes, magnetic particles, silica, ceramic, and carbon black.

Examples of the pigment may include carbon black and titanium black known as a black pigment. A white pigment may be used, examples of which may include titanium white and organic hollow particles. A color pigment may be used, examples of which may include anthraquinons, phthalocyanine blues, phthalocyanine greens, diazos, monoazos, pyranthrones, perylenes, heterocyclic yellows, quinacridones, and (thio)indigoids. Typical examples of the phthalocyanine blues may include copper phthalocyanine blue and derivatives thereof (pigment blue 15). Typical examples of the quinacridones may include pigment orange 48, pigment orange 49, pigment red 122, pigment red 192, pigment red 202, pigment red 206, pigment red 207, pigment red 209, pigment violet 19, and pigment violet 42. Typical examples of the anthraquinons may include pigment red 43, pigment red 194 (perynone red), pigment red 216 (brominated pyranthrone red), and pigment red 226 (pyranthrone red). Typical examples of the perylenes may include pigment red 123 (vermillion), pigment red 149 (scarlet), pigment red 179 (maroon), pigment red 190 (red), pigment violets, pigment red 189 (yellow shaded red), and pigment red 224. Typical examples of the (thio)indigoids may include pigment red 86, pigment red 87, pigment red 88, pigment red 181, pigment red 198, pigment violet 36, and pigment violet 38. Typical examples of the heterocyclic yellows may include pigment yellow 117 and pigment yellow 138. The cited literature, "The Colour Index", 3rd edition (The Society of Dyers and Colourists, 1982) may be referred to for any other suitable examples of the usable pigment.

When a dye is used as the colorant, one selected from the oil-soluble dyes and disperse dyes may be preferably used for better adsorption and sealing properties.

The content of the colorant in the color UV ink may preferably be approximately greater than or equal to 3% by weight and less than or equal to 5% by weight of the whole ink composition.

Thus, the ink set used in the inkjet printing device 1 further includes the color UV inks. This ink set, therefore, is usable for color printing as well as for metallic color printing. The solvent UV ink that excels in glossiness is used to form the metallic-colored print pattern, while the color UV inks very quick to dry are used to form the print patterns in the other colors. Using this ink set may serve the purposes of excellent glossiness and quick-dryness.

[Inkjet Printing Method]

The inkjet printing method disclosed herein is a printing method of printing an object on a recording medium by inkjet printing using the above-described ink set disclosed herein. The inkjet printing method disclosed herein includes a step of discharging the color UV inks, a step of discharging the solvent UV ink, and an ultraviolet irradiating step of irradiating the color UV inks and the solvent UV ink with ultraviolet light.

This inkjet printing method prints an object on the recording medium using the described ink set. In this method, the metallic particle-containing solvent UV ink is used to form the metallic-colored print pattern. After the solvent is removed from the solvent UV ink applied on the recording medium, the metallic particles may be uniformly oriented in the print pattern. Then, the print pattern consequently obtained may excel in glossiness.

While the solvent UV ink is solely used to form the metallic-colored print pattern, the color UV inks very quick to dry are used to form the print patterns in other different colors. These print patterns, therefore, may be fixed as desired to the recording medium in the ultraviolet irradiating step alone, without having to additionally include a print pattern drying step.

As described above, the inkjet printing device 1 discharges inks curable by being irradiated with ultraviolet light. The inkjet printing device 1 includes the inkjet head unit 6 that discharges an ink supplied from the ink set onto the recording medium 3; the UVLED unit 7 disposed at a position behind the inkjet head unit 6 in a scanning direction, the UVLED unit 7 being operable to irradiate the ink discharged from the inkjet head unit 6 and having landed on the recording medium 3 with ultraviolet light; and the controller 8 that changes the light quantity of ultraviolet light emitted from the UVLED unit 7 onto the ink by changing the light intensity of ultraviolet light emitted from the UVLED unit 7. The controller 8, in a path of movement of the UVLED unit 7 in the scanning direction, prompts the UVLED unit 7 to emit the first light quantity of ultraviolet light for precure of the ink discharged in the path from the inkjet head unit 6 and having landed on the recording medium 3. The controller 8, in a path of movement of the UVLED unit 7 in the opposite direction of the scanning direction, prompts the UVLED unit 7 to emit the second light quantity of ultraviolet light for full cure of the ink precured. The ink set includes the color UV inks each containing an ultraviolet-curable resin and a colorant but containing no metallic particle, and the solvent UV ink containing an ultraviolet-curable resin, a solvent, and metallic particles.

The inkjet printing method carries out a printing operation using inks curable by being irradiated with ultraviolet light. The inkjet printing method includes a discharging step of discharging an ink supplied from the ink set onto the recording medium 3; a first ultraviolet irradiating step of setting, in a path of movement of a UVLED unit 7 in a scanning direction, the light quantity of ultraviolet light emitted from the UVLED unit 7 as the first light quantity by changing the light intensity of ultraviolet light emitted from the UVLED unit 7, the first light quantity being intended for precure of the ink discharged in the discharging step and having landed on the recording medium 3, the first ultraviolet irradiating step further being a step of irradiating the ink discharged in the discharging step and having landed on the recording medium 3 with the first light quantity of ultraviolet light; a second ultraviolet irradiating step of setting, in a path of movement of the UVLED unit 7 in the opposite direction of the scanning direction, the light quantity of ultraviolet light emitted from the UVLED unit 7 as the second light quantity by changing the light intensity of ultraviolet light emitted from the UVLED unit 7, the second light quantity being intended for full cure of the ink precured in the first ultraviolet irradiating step, the second ultraviolet irradiating step further being a step of irradiating the ink precured in the first ultraviolet irradiating step with the second light quantity of ultraviolet light. The ink set includes the color UV inks each containing an ultraviolet-curable resin and a colorant but containing no metallic particle, and the solvent UV ink containing an ultraviolet-curable resin, a solvent, and metallic particles.

In the inkjet printing device 1, the inks of the ink set are discharged from the inkjet head unit 6 onto the recording medium 3. When the first light quantity of ultraviolet light is emitted from the UVLED unit 7, the inks that have landed on the recording medium 3 is precured. When the second light quantity of ultraviolet light is later emitted from the UVLED unit 7, the precured UV inks are then fully cured. Taking the step of precuring the ink before full cure may suppress the risk of ink smearing and may improve the ink in flatness. This may reduce any unevenness of the cured ink and also reduce light streaks due to the ink unevenness, improving the image quality of a printed matter. The present invention may enable precure and full cure of the ink by changing the light quantity of ultraviolet light emitted from the UVLED unit 7. Thus, the UVLED unit 7 is usable for both of precure and full cure of the inks. This may successfully achieve cost reduction and ensure efficiency in the ink curing process.

When the UVLED unit 7 moves in the scanning direction, the inks discharged from the inkjet head unit 6 are irradiated with the first light quantity of ultraviolet light emitted from the UVLED unit 7. Then, the ultraviolet curable ink that has landed on the recording medium 3 may be precured by the emitted light. When the UVLED unit 7 later moves in the opposite direction of the scanning direction, the precured inks are irradiated with the second light quantity of ultraviolet light emitted from the UVLED unit 7. This may fully cure the ink so far only precured. Thus, simply reciprocating the UVLED unit 7 or the recording medium 3 in the scanning direction may enable precure and full cure of the inks, allowing the inks to be more efficiently cured.

The light quantity is proportional to the light intensity. Therefore, the light quantity of ultraviolet light emitted from the UVLED unit 7 may be easily changed by changing the light intensity of ultraviolet light emitted from the UVLED unit 7.

The ink set disclosed herein has a plurality of types of inks to be discharged from the inkjet printing device. The inks may include the metallic particle-free, color UV inks each containing an ultraviolet-curable resin and a colorant but containing no metallic particle, and the solvent UV ink containing an ultraviolet-curable resin, a solvent, and metallic particles.

After the metallic particle-containing solvent UV ink in the ink set for printing use has landed on the recording medium 3, the solvent is removed from the solvent UV ink. Then, a print pattern formed on the recording medium 3 may be reduced in height to an extent substantially equal to the removed solvent. This may facilitate substantially parallel orientation of the metallic particles in the print pattern formed on the recording medium 3. Thus, the metallic particles may be uniformly oriented, and the print pattern obtained may excel in glossiness.

The ink set further having the color UV inks is not only usable for metallic color printing but also usable for color printing in the other colors. The solvent UV ink that excels in glossiness is used to form the metallic-colored print pattern, while the color UV inks very quick to dry are used to form print patterns in other different colors. This may improve the print patterns in glossiness and quick-dryness.

While the solvent UV ink is solely used to form the print pattern in the metallic color, the color UV inks very quick to dry are used to form the print patterns in the other colors. The print patterns, therefore, may be fixed as desired to the recording medium 3 by irradiating the inks with ultraviolet light alone, without having to additionally include a print pattern drying step.

In the ink set disclosed herein, the solvent UV ink contains the solvent in a content of greater than or equal to 10% by weight and less than or equal to 90% by weight.

By using the solvent UV ink containing the solvent in a content that falls within the described range, the metallic particles may be oriented as desired in the print pattern after the solvent is removed from the solvent UV ink on the recording medium 3.

Other than the inkjet printing method described above, a printing method hereinafter described may be applicable to the printing operation using the inks of the ink set disclosed herein.

[Inkjet Printing Method]

The inkjet printing method disclosed herein includes a step of discharging the color UV inks, a step of discharging the solvent UV ink, and an ultraviolet irradiating step of irradiating the color UV inks and the solvent UV ink with ultraviolet light. The discharging steps and the ultraviolet irradiating step are hereinafter described.

[Discharging Step]

In the color UV ink discharging step and the solvent UV ink discharging step, the respective inks are discharged onto the recording medium 3 from the inkjet head unit 6 illustrated in FIG. 1. In the color UV ink discharging step, the color UV inks in the respective colors are discharged onto the recording medium 3 from the inkjet heads 11a to 11d. In the solvent UV ink discharging step, the solvent UV ink containing metallic particles is discharged onto the recording medium 3 from the inkjet head 11e. Since the solvent UV ink containing metallic particles is used to form the metallic-colored print pattern, the metallic particles may be uniformly oriented after the solvent is removed from the solvent UV ink on the recording medium. Then, the print pattern consequently obtained may excel in glossiness.

In the respective discharging steps, the inks are discharged from the inkjet head unit 6 while moving along the guide rail 5 to form the print patterns on one line, and the recording medium 3 is then moved to similarly form the print patterns on a next line. The recording medium 3 is moved by a transport unit (not illustrated in the drawing). Either one of the color UV ink discharging step and the solvent UV ink discharging step may precede or follow the other step, meaning that any one of the inks may be discharged earlier or later than the others.

[Ultraviolet Irradiating Step]

In the ultraviolet irradiating step, the UVLED unit 7 illustrated in FIG. 1 irradiates the color UV inks and the solvent UV ink discharged on the recording medium 3 with ultraviolet light. In the ultraviolet irradiating step, the UVLED lamp of the UVLED unit 7 may be replaced with a high-pressure mercury lamp, such as a metal halide lamp.

In the respective discharging steps, the solvent UV ink is solely used to form the metallic-colored print pattern, while the color UV inks very quick to dry are used to form the other color print pattern. Therefore, no drying step may be necessary for the inks discharged in the discharging steps. The ultraviolet irradiating step that immediately follows the discharging steps may allow the print patterns to be promptly fixed to the recording medium 3.

Such a drying step, though not required to fully dry the inks, may be performed subsequent to the ultraviolet irradiating step to ensure the ink dryness. The present invention also includes in its scope an inkjet printing method including the drying step subsequent to the ultraviolet irradiating step. The inks may be dried in the drying step by any suitable one of the known drying techniques.

The intensity of ultraviolet light emitted from the UVLED unit 7 may be decided as appropriate depending on the types of inks used. Specifically, the intensity of ultraviolet light necessary for cure of the inks depends on a resin(s) contained in the inks as a binder, for example, a monomer and/or an oligomer. When any commercially available products are used as the color UV inks and the solvent UV ink, instructions set forth in a user's manual should be followed.

When the inkjet head unit 6 is discharging the inks while moving in the direction illustrated with arrow A, the UVLED unit 7 is moving behind the inkjet head unit 6 in the direction of movement. The UVLED unit 7 moving in this direction irradiates the inks with ultraviolet light while moving over a resulting ink line. When the inkjet head unit 6 is discharging the inks while moving in the opposite direction of the arrow-A direction, the UVLED unit 7 is moving ahead of the inkjet head unit 6 in the direction of movement. There is no ultraviolet radiation from the UVLED unit 7 moving in this direction. The inks discharged on a line from the inkjet head unit 6 moving in the opposite direction of the arrow-A direction are cured by ultraviolet light emitted from the UVLED unit 7 moving in the arrow-A direction when the inkjet head unit 6 is discharging the inks on a line next to the line while moving in the arrow-A direction. To this end, the UVLED unit 7 has its range of ultraviolet radiation and intensity regulated so as to cure the inks discharged on at least a line directly below the UVLED unit 7 and a line next to the line.

In case the UVLED unit 7 is disposed at a position ahead of the inkjet head unit 6 in the arrow-A direction, the UVLED unit 7 is moving ahead of the inkjet head unit 6 in the direction of movement. The UVLED unit 7 does not emit ultraviolet light when the inkjet head unit 6 is moving in the arrow-A direction. When the inkjet head unit 6 is moving in the opposite direction of the arrow-A direction, the UVLED unit 7 moving in the same direction emits ultraviolet light to cure the inks discharged on a line directly below the UVLED unit 7 and a line next to the line. In a case where plural UVLED units 7 are disposed at positions ahead and behind the inkjet head unit 6 in the arrow-A direction, ultraviolet light is emitted from only one of the UVLED units 7 behind the inkjet head unit 6 in the direction of movement regardless of whether the inkjet head unit 6 is moving in the arrow-A direction or its opposite direction.

The inkjet printing method disclosed herein, as described thus far, prints an object on the recording medium using the ink set disclosed herein. The inkjet printing method includes: a discharging step of discharging the color UV inks onto the recording medium 3; a step of discharging the solvent UV ink onto the recording medium 3; and an ultraviolet irradiating step of irradiating the color UV inks and the solvent UV ink on the recording medium 3 with ultraviolet light.

The inkjet printing method disclosed herein may further include a drying step of drying the color UV ink and the solvent UV ink subsequent to the ultraviolet irradiating step.

In this inkjet printing method, the inks irradiated with ultraviolet light in the ultraviolet irradiating step are dried in the drying step, so that the print patterns are more securely fixed to the recording medium 3.

The present invention is not necessarily limited to the embodiments described above and may be carried out in many other forms. The technical scope of the present invention encompasses any of such modifications, and embodiments obtained by variously combining the technical means described in the embodiments.

INDUSTRIAL APPLICABILITY

The present invention is usefully applicable to inkjet printing techniques.

The invention claimed is:
1. An inkjet printing method of performing a printing operation on a recording medium using an ink set, wherein the ink set comprising a plurality of types of inks to be discharged from an inkjet printing device, and the ink set comprising: a color UV ink, containing an ultraviolet-curable resin and a colorant but containing no metallic particle; and a solvent UV ink, containing an ultraviolet-curable resin, a solvent, and metallic particles, and the inkjet printing method comprising:
   a step of discharging the color UV ink onto the recording medium;
   a step of discharging the solvent UV ink onto the recording medium;
   an ultraviolet irradiating step of irradiating the color UV ink and the solvent UV ink on the recording medium with ultraviolet light; and
   a solvent removing step of removing the solvent from the solvent UV ink discharged on the recording medium, so as to orient the metallic particles in a direction parallel to the recording medium,
   wherein the metallic particles have a scaly shape and/or a flat shape.
2. The inkjet printing method as set forth in claim 1, further comprising:
   a drying step of drying the color UV ink and the solvent UV ink subsequent to the ultraviolet irradiating step.

3. An inkjet printing method of performing a printing operation using inks curable by being irradiated with ultraviolet light, the inkjet printing method comprising:

a discharging step of discharging an ink supplied from an ink set onto a recording medium;

a first ultraviolet irradiating step of setting, in a path of movement of an ultraviolet irradiator in a scanning direction, a light quantity of ultraviolet light emitted from the ultraviolet irradiator as a first light quantity by changing a light intensity of ultraviolet light emitted from the ultraviolet irradiator, the first light quantity being intended for precure of the ink discharged in the discharging step and having landed on the recording medium, the first ultraviolet irradiating step further being a step of irradiating the ink discharged in the discharging step and having landed on the recording medium with the first light quantity of ultraviolet light; and a second ultraviolet irradiating step of setting, in a path of movement of the ultraviolet irradiator in a direction opposite to the scanning direction, the light quantity of ultraviolet light emitted from the ultraviolet irradiator as a second light quantity by changing the light intensity of ultraviolet light emitted from the ultraviolet irradiator, the second light quantity being intended for full cure of the ink precured in the first ultraviolet irradiating step, the second ultraviolet irradiating step further being a step of irradiating the ink precured in the first ultraviolet irradiating step with the second light quantity of ultraviolet light, wherein the ink set comprising a plurality of types of inks to be discharged from an inkjet printing device, and the ink set comprising:

a color UV ink, containing an ultraviolet-curable resin and a colorant but containing no metallic particle; and a solvent UV ink, containing an ultraviolet-curable resin, a solvent, and metallic particle, wherein the metallic particle has a scaly shape and/or a flat shape, and the inkjet printing method further comprising:

a solvent removing step of removing the solvent from the solvent UV ink discharged on the recording medium, so as to orient the metallic particle in a direction parallel to the recording medium.

* * * * *